United States Patent [19]

Schulz et al.

[11] Patent Number: 4,788,247

[45] Date of Patent: Nov. 29, 1988

[54] TERPOLYMERS OF ACRYLAMIDE, ALKYL POLYETHEROXYACRYLATE AND BETAINE MONOMERS

[75] Inventors: Donald N. Schulz, Annandale; Ilan Duvdevani, Leonia; Jan Bock, Bridgewater; Jeff J. Kaladas, S. Bound Brook, all of N.J.

[73] Assignee: Exxon Research and Engineering Company, Florham Park, N.J.

[21] Appl. No.: 121,399

[22] Filed: Nov. 16, 1987

Related U.S. Application Data

[63] Continuation-in-part of Ser. No. 907,479, Sep. 15, 1986, abandoned, which is a continuation-in-part of Ser. No. 815,218, Dec. 31, 1985, abandoned.

[51] Int. Cl.⁴ .................. C08F 28/02; C08F 20/38; C08F 20/60
[52] U.S. Cl. .................. 524/547; 526/263; 526/287; 524/401
[58] Field of Search .................. 526/263, 288, 287; 524/547, 401

[56] References Cited

U.S. PATENT DOCUMENTS 4,560,710 12/1985 Schulz .................. 526/288
4,650,848 3/1987 Schulz .................. 526/287
4,742,135 5/1988 Schulz .................. 526/287

FOREIGN PATENT DOCUMENTS 0023712 2/1981 European Pat. Off. ............ 526/288

Primary Examiner—C. Warren Ivy
Attorney, Agent, or Firm—Richard E. Nanfeldt

[57] ABSTRACT

A water or brine soluble terpolymer having the structure:

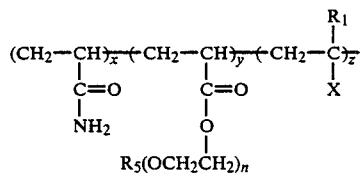

wherein x is selected from the group consisting of

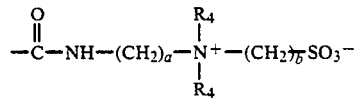

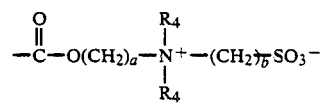

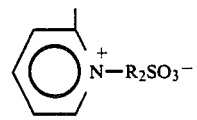

wherein x is about 70 to about 95 mole percent; y is about 0.1 to about 5.0 mole percent; z is about 1 to about 30 mole percent; $R_1$ is methyl or hydrogen; a is about 1 to about 5; b is about 3 to about 4; $R_3$ is an alkyl group of 3 to 4 carbon atoms; $R_4$ is an alkyl group having about 1 to 5 carbon atoms; $R_5$ is selected from the group consisting of an alkyl group having 1 to 30 carbons, a hydrocarbon aryl group having about 6 to 20 carbons and an alkylaryl group having the structure of

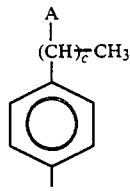

wherein A is selected from the group consisting of hydrogen, methyl groups, ethyl groups and propyl groups and mixtures thereof and c is about 6 to 20; and n is about 1 to 60.

2 Claims, 1 Drawing Sheet

TERPOLYMERS OF ACRYLAMIDE, ALKYL POLYETHEROXYACRYLATE AND BETAINE MONOMERS

CROSS-REFERENCE TO RELATED APPLICATIONS

This Application is a continuation-in-part application of U.S. Ser. No. 907,479, filed Sept. 15, 1986, which is a continuation-in-part application of U.S. Ser. No. 815,218, filed Dec. 31, 1985; both now abandoned.

BACKGROUND OF THE INVENTION

Poly(sodium acrylamidomethyl propane sulfonate) P(NaAMPS), hydrolyzed polyacrylamide, and copolymers thereof are water soluble polymers that have been previously disclosed in the literature and have found application in the viscosification of aqueous solutions which is achieved through a combination of high molecular weight and chain expansion due to repulsion of pendant ionic groups along the polymer chain or H-bonding. These polymers are salt-sensitive, thereby limiting their application in highly saline systems.

The betaines are a special class of zwitterions. These materials are self-neutralized and contain no counter-ions. Moreover, the positive and negative charges are separated by alkyl groups.

Carboxymethacrylate betaine monomers (I) and polymers (II) are well-known and disclosed in U.S. Pat. No. 2,777,872 (Jan. 15, 1957), U.S. Pat. No. 2,834,758 (May 13, 1958) and U.S. Pat. No. 2,846,417 (Aug. 5, 1958).

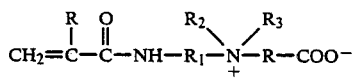

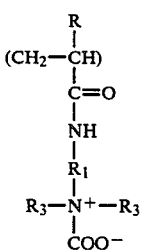

Carboxyvinylpyridine betaine monomers and homopolymers (III) have also been reported (H. Ladenheim and H. Morawetz, J. Poly. Sci. 26, 251 [1957]).

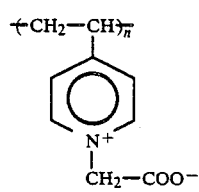

Sulfovinylpyridine betaine monomers and homopolymers (IV) are known (R. Hart and D. Timmerman, J. Poly. Sci. 28, 118 [1958]) and Ger. Auslegeschrift No. 1,207,630 and Galin, et al., Polymer, 25, 121,254 (1984).

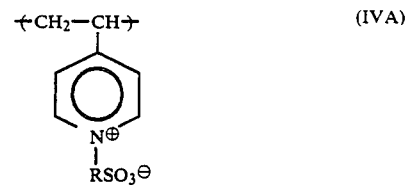

The butylsulfobetaine of poly(2-vinylpyridine) (IVB) is soluble in water, but the butylsulfobetaine of poly(4-vinylpyridine) (IVA) is not. Both betaines are soluble in salt solution.

Methacrylate based sulfobetaine monomers and homopolymers (V) are described by Galin Polymer 25, 121,254 (1984) and Ger. Auslegeschrift No. 1,207,630.

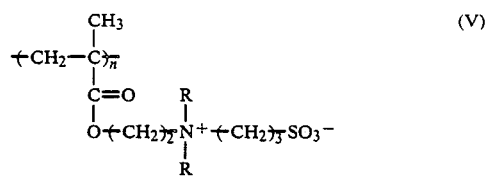

Copolymers of acrylamide and methacrylacrylate and vinyl pyridine betaine monomers, like IV and V, are described in Ger. Auslegeschrift No. 1.207,630, U.S. Pat. No. 3,549,605 and U.S. Pat. No. 3,493,547.

In turn, copolymers of acrylamide and alkyl(polyetheroxy)acrylate monomers are described in U.S. Pat. Nos. 4,463,151 and 4,463,152 (D. N. Schulz, J. J. Maurer and J. Bock). Enhanced viscosification is claimed for these materials.

SUMMARY OF THE INVENTION

The present invention relates to unique and novel betaine terpolymers which are terpolymers of acrylamide, alkyl(polyetheroxy)acrylate and ester-, amide- or vinyl pyridine-based betaine monomers. Such polymers contain both zwitterion and hydrophobic groups and are represented by the following structures:

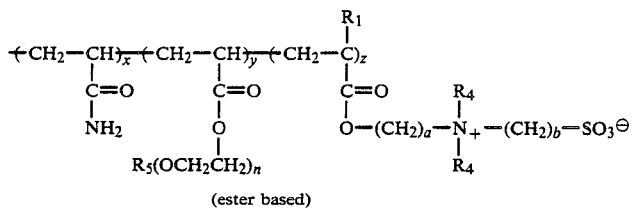

(ester based)

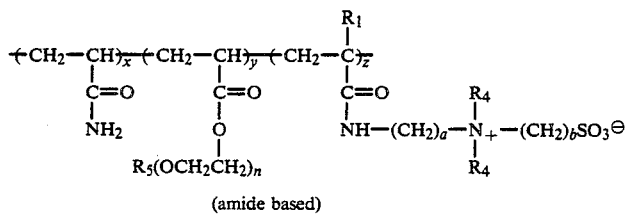

(amide based)

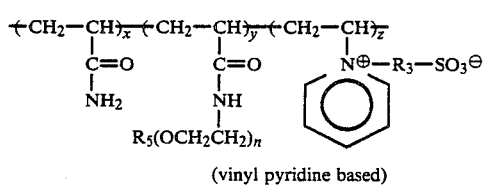

(vinyl pyridine based)

wherein x is about 70 to about 95 mole percent, more preferably about 80 to about 90 mole percent; y is about 0.1 to about 5.0 mole percent; more preferably about 0.2 to about 3.0; and z is about 1 to about 30 mole percent, more preferably about 5 to about 20 mole percent. $R_1$ is methyl or hydrogen; a is about 1 to about 5 and b is about 3 to about 4 carbons; $R_4$ is an alkyl group of 1 to 5 carbon atoms; $R_5$ is selected from the group consisting of an alkyl group having about 1 to 30 carbons, a hydrocarbon aryl group of 6 to 20 carbons and an alkylaryl group having the formula:

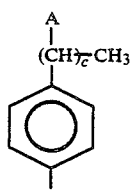

wherein A is selected from the group consisting of hydrogen, methyl groups, ethyl groups and propyl groups and mixtures thereof, and C is about 6 to about 30; and n is about 1 to about 60, more preferably about 5 to about 40.

Thus, the instant structures are different from conventional polyelectrolyte homo- or copolymers, which contain either positive or negative charges. In addition, unlike conventional polyelectrolytes, the aqueous viscosities of the instant materials increase with increasing concentration of salts like sodium chloride.

The present invention is distinguished from the carboxymethacrylate betaine homopolymers and copolymers (U.S. Pat. Nos. 2,777,872, 2,834,758, 2,846,417) because sulfonate vs. carboxylate anions and low vs. high charge densities are used. Furthermore, carboxylate anions are limited by their known susceptibility to precipitation by polyvalent cations (e.g. $Ca^{++}$); the latter species are often found in geological formations (F. J. Glaris in "Water Soluble Resins" 2nd Ed, R. L. Davidson and M. Sittig, Eds., Rheinhold, New York, p. 168). Sulfonate anions are not so limited.

The instant invention is different from other sulfobetaine polymers of the art by virtue of the presence of the alkyl(poly-etheroxy)acrylate group and by the surprisingly high enhancement in viscosities with increasing salt contents.

The instant terpolymers are distinguished from the copolymers of acrylamide and alkyl(poly-etheroxy)acrylate monomers by their chemical structures and their unexpected high viscosity retention in high concentration of aqueous salt.

GENERAL DESCRIPTION OF THE INVENTION

Figure 1:
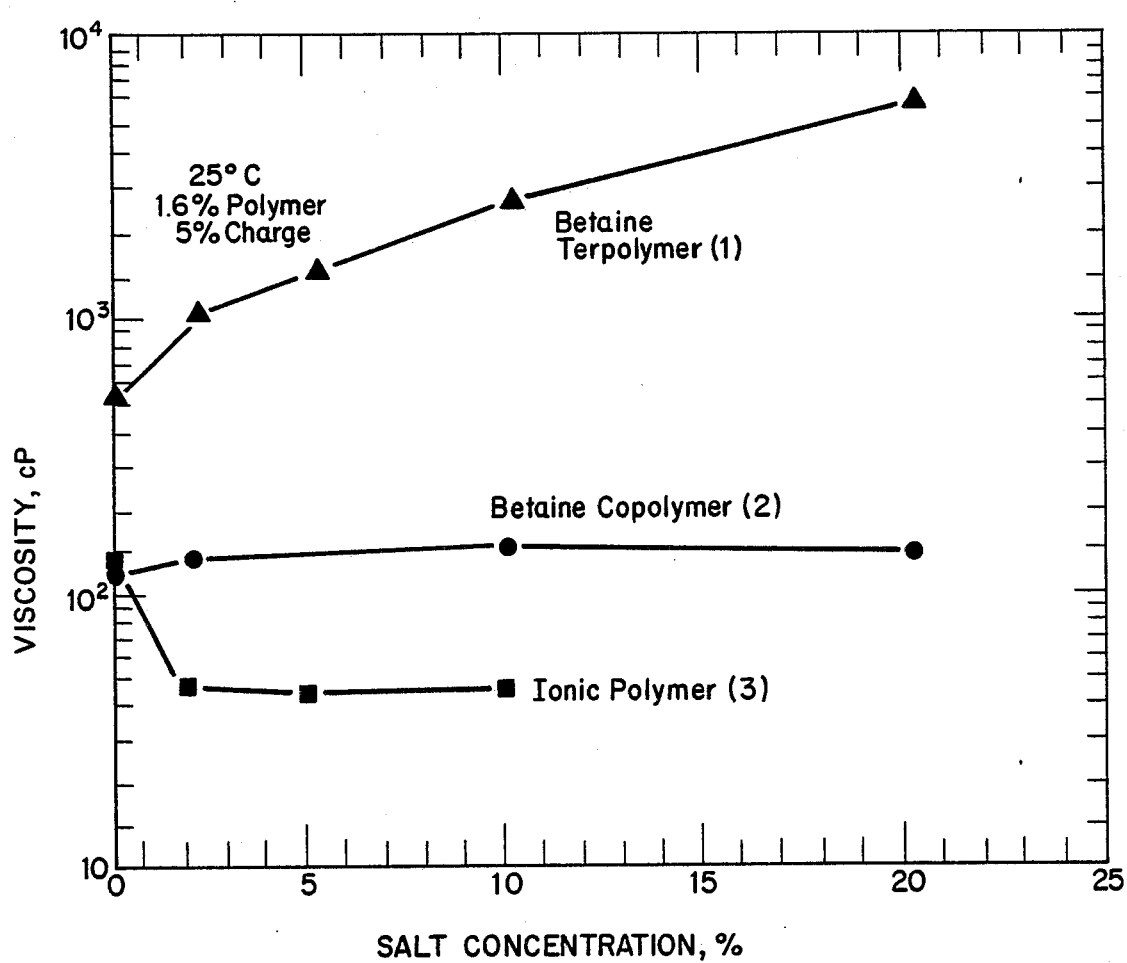
FIG. 1 illustrates a graph of viscosity of polymer systems versus salt concentration.

The present invention relates to a method for increasing the viscosity of an aqueous or salt solution which comprises the steps of dissolving about 0.1 to about 5.0 wt.% of a water or brine soluble terpolymer of acrylamide/alkyl(polyetheroxy)acrylate in an aqueous solution, wherein the aqueous solution is selected from the group consisting of a water or salt solution wherein the salt concentration is about 0.01 to about 20.0 wt.%.

The viscosifying agents for aqueous and saline solutions of the present invention are betaine terpolymers formed by a homogeneous, free radical, terpolymerization, wherein the water soluble terpolymers are characterized by the formulae:

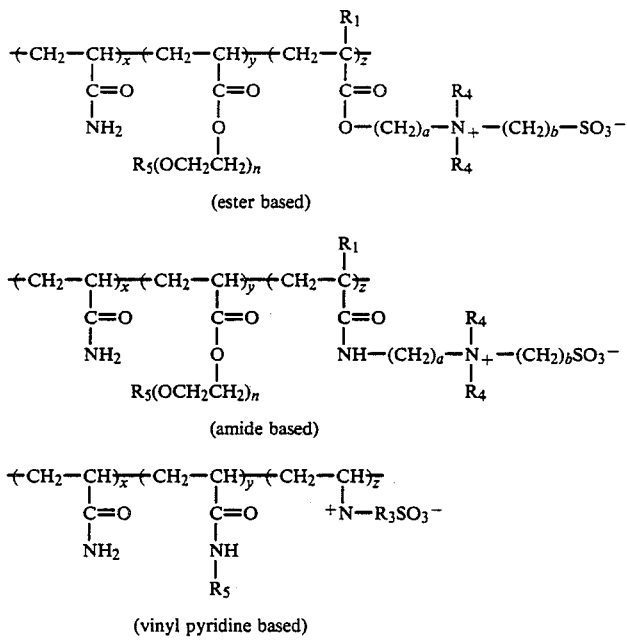

(ester based)

(amide based)

(vinyl pyridine based)

wherein x is about 70 to about 95 mole percent, more preferably about 80 to about 90 mole percent; y is about 0.1 to about 5.0 mole percent; more preferably about 0.2 to about 3.0; and z is about 1 to about 30 mole percent, more preferably about 5 to about 20 mole percent. $R_1$ is methyl or hydrogen; a is about 1 to about 5 and b is about 3 to 4; $R_4$ is an alkyl group of 1 to 5 carbon atoms; $R_5$ is selected from the group consisting of an alkyl group of 1 to 30 carbons, a hydrocarbon aryl group having about 6 to 20 carbons and having the formula:

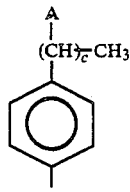

wherein A is selected from the group consisting of hydrogen, methyl groups, ethyl groups and propyl groups and mixtures thereof, and c is about 6 to 20; and n is about 1 to about 60, more preferably about 5 to about 40.

The homogeneous terpolymerization process of the instant invention comprises the steps of forming a mixture of acrylamide monomer, alkyl(polyetheroxy)acrylate monomer and betaine monomer under a nitrogen atmosphere; adding deoxygenated water to said mixture to form a reaction solution; heating said reaction solution to 50° C.; adding a free radical initiator to said reaction solution to initiate the copolymerization of the acrylamide monomer, alkyl(polyetheroxy)acrylate monomer and the betaine monomer; polymerizing the monomers at a sufficient temperature and for a sufficient time to form the water soluble terpolymer of acrylamide monomer, alkyl(polyetheroxy)acrylate monomer and betaine monomer; and recovering the water soluble terpolymer from the reaction solution.

Suitable free radical initiators for the instant free radical-copolymerization process are potassium persulfate; sodium thiosulfate, potassium persulfate mixture; benzoyl peroxide, AIBN and other common free radical initiators. The concentration of the free radical initiator is about 0.02 to about 0.50 grams per 100 grams of total monomer.

Polymerization of the acrylamide monomer, alkyl(polyetheroxy)acrylate monomer and N-3(3-sulfopropyl)-N-methacryol-oxyethyl-N,N-dimethylammonium-betaine monomer is effective at a temperature of about 25° to about 90° C., more preferably at about 30° to about 65° C., and most preferably at about 45° to about 55° C. for a period of about 1 to about 48 hours, more preferably at about 2 to about 36, and most preferably at about 4 to about 24. A suitable method for recovery of the formed terpolymer from the reaction solution comprises precipitation by means of acetone.

DESCRIPTION OF THE PREFERRED EMBODIMENTS

The following Examples illustrate the present invention without, however, limiting the same hereto.

EXAMPLE 1

Terpolymer of acrylamide, alkyl poly(etheroxy)acrylate, and N-(3-sulfopropyl)-N-methacroyloethyl-N,N-dimethyl ammonium betaine (SPE)

A two liter reaction kettle was equipped with an air driven stirrer, water condenser and thermometer. One liter of distilled deionized water was added and heated at 50°-55° C. for one hour while stirring and purging with nitrogen below the solvent surface. The nitrogen inlet was raised and the two monomers, acryl amide (30 grams), nonylphenoxy (polyetheroxyacrylate) (Monomer Polymer Co.-8615) (1.43 grams) and N-(3-sulfopropyl)-N-methacroyloxyethyl-N,N-dimethylammonium betaine (SPE) (6.1 grams) and 1.43 grams nonylphenoxy (polyetheroxyacrylate) (Monomer Polymer 8615). This corresponds to a 95/0.45/5 mole percent charge ratio. A 0.023 gram quantity of $K_2S_2O_8$ initiator was charged and the polymerization continued at 52°–54° C. for 17.5 hours.

EXAMPLE 2

Poly(acrylamide)-CO-N-(3-sulfopropyl)-N-methacryoloxyethyl-N,N-dimethylammonium betaine) (95/5 mole %)

A two liter reaction kettle was equipped with an air driven stirrer, water condenser, thermometer and subsurface nitrogen purge. One liter of distilled deionized water was added and heated at 50°–55° C. for one hour while stirring and rapid nitrogen sweep. The nitrogen inlet was raised and the monomers, acrylamide (30 grams) and N-(3-sulfopropyl)-N-methacryoloxyethyl-N,N-dimethylammonium betaine (SPE) (6.1 grams), were added. This corresponds to a 95/5 mole percent charge ratio. A 0.023 quantity of $K_2S_2O_8$ initiator was charged and the polymerization continued at 52°–54° C. for 19 hours. Polymer was isolated by acetone precipitation and vacuum drying.

EXAMPLE 3

Poly(acrylamide-co-Sodium Styrene Sulfonate) (95/5 mole)

A control polyelectrolyte was prepared according to the method of Example 1, except that sodium styrene sulfonate was substituted for SPE at a 5 mole percent charge level. Thus, 30 grams of acrylamide, 4.53 grams of poly (sodium styrene sulfonate) were charged to the reactor with 1 liter of distilled, deionized water. A 0.023 gram quantity of $K_2S_2O_8$ initiator was charged and the polymerization continued at 51° to 52° C. for 17 hours. The batch was diluted with additional water, precipitated with acetone and vacuum dried.

EXAMPLE 4

Viscosity of Aqueous Solutions with Varied Salt Concentrations

Viscosity measurements were carried out for solutions of polymers 1, 2 and 3 in water and in water to which sodium chloride salt was added.

Polymer 1 was a terpolymer of acrylamide, alkyl polyetheroxyacrylates, and N-(3-sulfopropyl)-N-methacryoloxyethyl-N,N-dimethylammonium betaine prepared as in Example 1 at a molar ratio of 94.55/0.45/5.

Polymer 2 was a copolymer of acrylamide and N-(3-sulfopropyl)-N-methacroyloxyethyl-N,N-dimethylammonium betaine prepared as in Example 2 at a molar monomer ratio of 95/5.

Polymer 3 was a copolymer of acrylamide and sodium styrene sulfonate prepared as in Example 3 at a molar monomer ratio of 95/5.

Viscosity of the aqueous solution of Polymer 1 and of Polymer 2 with and without added sodium chloride were measured in a Haake viscometer (model CV-100) at 25° C. and at a low shear rate of 3 sec$^{-1}$. Viscosity of the aqueous solutions with and without sodium chloride salt of Polymer 3 were measured by a Brookfield viscometer at 25° C. and at a low shear rate. All the solutions contained approximately 1.6% polymer and viscosity was determined as a function of salt concentration.

FIG. 1 compares the viscosities of polymers 1, 2 and 3. Polymer 3, an ionic polymer or classical polyelectrolyte, shows a substantial loss in viscosity with increasing salt concentrations. Polymer 2, a copolymer of acrylamide and the betaine monomer SPE, shows a slight increase in viscosity with increasing salt concentration. However, polymer 1, a terpolymer of acrylamide, betaine monomer (SPE) and alkyl polyetheroxyacrylate, shows a sharp and unexpected increase in viscosity with increasing salt concentration.

EXAMPLE 5

Poly(acrylamide-co-Alkyl Polyetheroxy-acrylates-co-N-(3-sulfopropyl)-N-Methacroyloxyethyl-N,N-Dimethyl Ammonium Betaine (89.55/0.45/10)

The method of Example 1 was followed, except that 30 grams of acrylamide, 1.43 grams of nonylphenoxy (polyetheroxy acrylate) and 1.28 grams of SPE were copolymerized by 0.023 grams of $K_2S_2O_8$. This corresponds to a molar ratio of 89.55/0.45/10 for the respective charged monomers. The Brookfield viscosities of the polymer in salt were as follows:

| 10% NaCl | 450 |
| 20% NaCl | 3,000 cps |

Thus, this Example also shows the surprising increase in viscosity with increasing salt concentration for the terpolymers of acrylamide, betaine monomer (SPE) and alkyl polyetheroxyacrylate. This particular Example is for a terpolymer of higher betaine monomer content than the polymer of Example 1.

What is claimed is:

1. A water or brine soluble terpolymer having the structure:

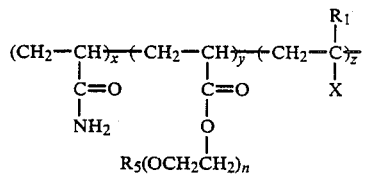

wherein X is selected from the group consisting of

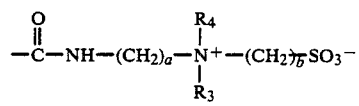

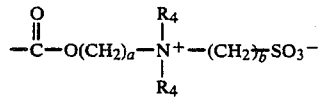

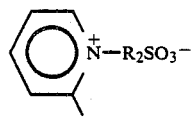

wherein x is about 70 to about 95 mole percent; y is about 0.1 to about 5.0 mole percent; z is about 1 to about 30 mole percent; $R_1$ is methyl or hydrogen; a is about 1 to about 5; b is about 3 to about 4; $R_3$ is an alkyl group of 3 to 4 carbon atoms; $R_4$ is an alkyl group having about 1 to 5 carbon atoms; $R_5$ is selected from the group consisting of an alkyl group having 1 to 30 carbons, a hydrocarbon aryl group having about 6 to 20 carbons and an alkylaryl group having the structure of

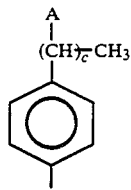

wherein A is selected from the group consisting of hydrogen, methyl groups, ethyl groups and propyl groups and mixtures thereof and c is about 6 to 20; and n is about 1 to 60.

2. A method for increasing the viscosity of an aqueous solution which comprises the step of dissolving in said aqueous solution a water or brine soluble terpolymer having the structure:

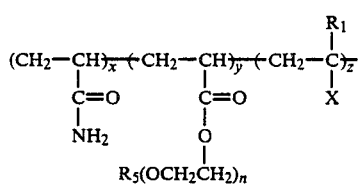

wherein x is selected from the group consisting of

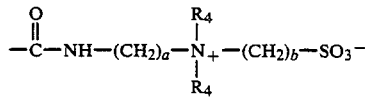

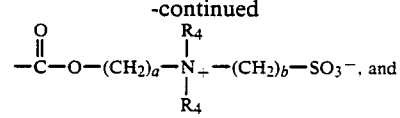

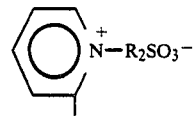

wherein x is about 70 to about 95 mole percent; y is about 0.1 to about 5.0 mole percent; z is about 1 to about 30 mole percent; $R_1$ is methyl or hydrogen; $R_3$ is an alkyl group of 3 to 4 carbon atoms; $R_4$ is an alkyl group of 1 to 5 carbon atoms; $R_5$ is selected from the group consisting of an alkyl group having 1 to 30 carbons, a hydrocarbon aryl group having 6 to 20 carbons and an alkylaryl group having the structure of

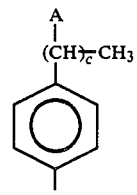

wherein A is selected from the group consisting of hydrogen, methyl groups, ethyl groups and propyl groups and mixtures thereof and c is about 6 to about 20; and n is about 1 to about 60; wherein the aqueous solution is selected from the group consisting of water or salt solution, wherein the salt concentration is about 0.01 to about 20 weight percent.

* * * * *